United States Patent
Ratto

(10) Patent No.: US 11,084,661 B2
(45) Date of Patent: Aug. 10, 2021

(54) SYSTEM FOR CONVEYING PRODUCTS IN SUCCESSION ALONG AN INDUSTRIAL LINE

(71) Applicant: SOREMARTEC S.A., Findel (LU)

(72) Inventor: Gabriele Ratto, Alba (CN) (IT)

(73) Assignee: SOREMARTEC S.A., Findel (LU)

(*) Notice: Subject to any disclaimer, the term of this patent is extended or adjusted under 35 U.S.C. 154(b) by 196 days.

(21) Appl. No.: 16/393,440

(22) Filed: Apr. 24, 2019

(65) Prior Publication Data
US 2019/0329988 A1 Oct. 31, 2019

(30) Foreign Application Priority Data
Apr. 27, 2018 (LU) .................................. 100 782

(51) Int. Cl.
*B65G 43/00* (2006.01)

(52) U.S. Cl.
CPC .......... *B65G 43/00* (2013.01); *B65G 2201/02* (2013.01); *B65G 2203/0216* (2013.01); *B65G 2203/044* (2013.01)

(58) Field of Classification Search
CPC ................ B65G 43/00; B65G 2201/02; B65G 2203/0216; B65G 2203/044
See application file for complete search history.

(56) References Cited

U.S. PATENT DOCUMENTS

| | | | | |
|---|---|---|---|---|
| 3,000,519 A | * | 9/1961 | Purnell | B07C 3/006 198/349.8 |
| 4,829,445 A | * | 5/1989 | Burney | G05B 19/4183 700/230 |
| 5,268,849 A | * | 12/1993 | Howlett | B01F 13/1055 141/103 |
| 6,289,260 B1 | * | 9/2001 | Bradley | B65G 1/1373 414/273 |
| 6,847,859 B2 | * | 1/2005 | Nuebling | G01B 11/04 198/502.2 |
| 9,201,163 B2 | * | 12/2015 | Vegh | G01V 8/20 |
| 2007/0125727 A1 | * | 6/2007 | Winkler | B65G 1/06 211/59.2 |
| 2009/0306816 A1 | * | 12/2009 | Champel | B07C 5/34 700/223 |
| 2012/0150342 A1 | * | 6/2012 | Song | B07C 3/10 700/226 |
| 2018/0327192 A1 | * | 11/2018 | Hamaguchi | B65G 43/08 |
| 2019/0205584 A1 | * | 7/2019 | Tachibana | G06K 7/1413 |

* cited by examiner

*Primary Examiner* — Michael Collins
(74) *Attorney, Agent, or Firm* — Rothwell, Figg, Ernst & Manbeck. P.C.

(57) ABSTRACT

A system for conveying products in succession along an industrial line, the system including at least one conveyor configured for conveying the products along at least one stretch of the line. Provided on the conveyor are codes to identify a series of distinct areas, for reception of the products. The system also includes one or more devices configured for detecting the codes of the areas of the conveyor when the areas are located in a position, along the line, where the products undergo a given operation; and a control unit configured for processing the codes so as to determine one or more data regarding the products.

18 Claims, 5 Drawing Sheets

SYSTEM FOR CONVEYING PRODUCTS IN SUCCESSION ALONG AN INDUSTRIAL LINE

CROSS REFERENCE TO RELATED APPLICATION

This application is claims priority to Luxembourgian Application No. 100 782, filed Apr. 27, 2018. The entirety of the disclosure of the above-referenced application is incorporated herein by reference.

TECHNICAL FIELD AND PRIOR ART

The present invention relates to a system for conveying products in succession along an industrial line.

In particular, the present invention refers to systems in which the conveying line is configured, at least in part, for receiving the products in a free state, i.e., simply resting on a supporting surface and not being constrained in any way in a specific position. The most widespread example of a line of this type is represented by conveyor belt.

Conveying lines of the type in question afford the advantage of presenting a structure simpler than lines that envisage moulds, trays, etc., for containing the products conveyed, and moreover afford the advantage of enabling an altogether flexible management of the flow of products.

FIG. 5 represents an example of industrial packaging line.

This comprises a formation of packaging machines M1-M4 arranged in series, and a conveying system 100, which receives in an upstream position of the line the products coming, for example, from a production line, and feeds them continuously to the packaging machines M1-M4. The conveying system 100 comprises a main trunk 110, which extends in a direction of feed T, from the point upstream of the system where the products are received, to a point downstream, passing through the entire formation of the packaging machines M1-M4.

Branching off from the main trunk 110 are the branches 111-114 that lead to the respective packaging machines M1-M4.

Moreover, the conveying system 100 envisages a recirculation stretch 120, which extends parallel to the main trunk 110 and is designed to bring the products that reach the end of the main trunk 110 back again to an initial stretch thereof so that they can again be fed to the packaging machines.

On the other hand, provided along the main trunk 110 itself are branches 133, 134 that lead to the machines M3, M4 starting from points of the main trunk downstream of the aforesaid machines, and moreover, stretches 143 and 144 that feed the products in the two opposite directions.

The various parts referred to of the conveying system may be mostly constituted by conveyor belts, whereas more limited stretches may envisage chutes, trays, surfaces with pushers, etc.

The conveying system described above enables management of the flows of products in a somewhat flexible way, in the perspective of enabling the packaging machines to operate at full capacity, as well as, on the other hand, enabling handling of any possible arrest of one or more of the packaging machines without any need to interrupt operation of the entire line.

This means that, for example, on account of particular operating conditions of the line, a product transferred from the production line onto the conveying system 100 may traverse the entire trunk 110, the recirculation line 120, the stretch 143 in the two directions, and finally the stretch 133, before reaching a packaging machine.

AIM AND SUBJECT OF THE INVENTION

In this context, the object of the present invention is to improve known conveying systems of the type referred to above, in particular from the standpoint of the possibility of control and monitoring of the products.

In this regard, it may be noted that in such systems only a control of the flows of product is envisaged, whereas no monitoring of the individual products is carried out.

An obstacle, in the case of a control of this type, is certainly represented by the free condition of the products on the conveying line, which, if on the one hand considerably facilitates transfer from one conveyor to another, changes of direction, etc., on the other hand, deprives, instead, the system of any reference for identifying and recognising the products.

To return to the example of FIG. 5, the known system illustrated therein is in fact in no way able to know whether the product P that is travelling along the trunk 110, in the stretch between the branches 111 and 112, comes directly from the production line upstream, or instead from the recirculation line 120, after it has already traversed the trunk 110 once.

The conveying system described herein is instead able to control and monitor the individual products along the entire conveying line, thanks to the characteristics that will be described in what follows. In general, the subject of the present invention is a conveying system according to claim 1. A further subject of the present invention is moreover the method according to claim 13.

The claims form an integral part of the technical teaching provided herein in relation to the invention.

BRIEF DESCRIPTION OF THE DRAWINGS AND DETAILED DESCRIPTION OF ONE OR MORE EMBODIMENTS OF THE INVENTION

Further characteristics and advantages of the invention will emerge clearly from the ensuing description, with reference to the annexed drawings, which are provided purely by way of non-limiting example and in which.

In the ensuing description, various specific details are illustrated aimed at providing an in-depth understanding of the embodiments. The embodiments may be obtained without one or more of the specific details, or with other methods, components, or materials, etc. In other cases, known structures, materials, or operations are not illustrated or described in detail so that various aspects of the embodiment will not be obscured.

The references used herein are provided merely for convenience and hence do not define the sphere of protection or the scope of the embodiments.

As anticipated above, the present invention relates to a system for conveying products in succession along an industrial line, which may, for example, be a production line or else a packaging line.

The system may hence be designed for conveying both finished products and intermediate products.

The system described herein envisages a conveying line on which—for at least one stretch thereof—the products are arranged according to a free condition, i.e., without being constrained in a specific position on the line.

The line may, for example, envisage a conveyor belt, trays moved on chains or belts, catenaries and conveyor belting of various kind, etc. In what follows, the generic term "conveyor" will be used to indicate any one of such means.

Figure 4:
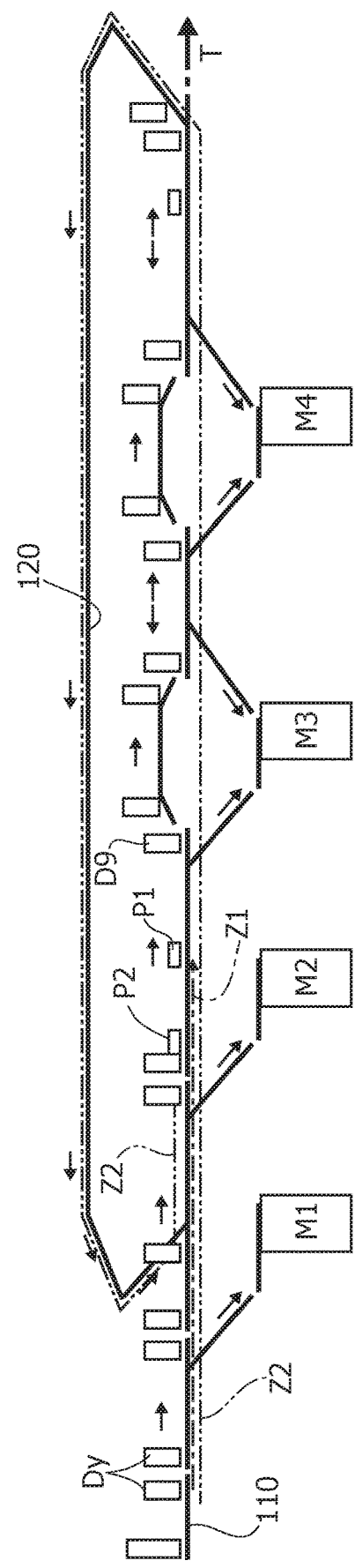
FIG. 4 illustrates an example of the conveying system described herein.
Figure 5:
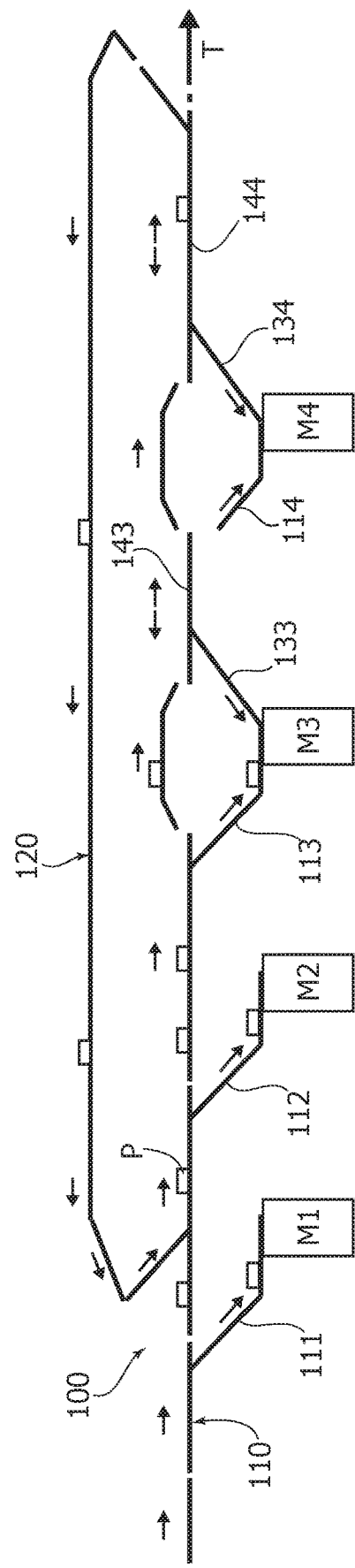
FIG. 5 illustrates a conveying system according to the known art.

In general, the conveying line of the system may envisage any configuration (for example, as will be seen in greater detail in what follows, FIG. 4 illustrates an embodiment in which the conveying line has the same configuration as the conveying line of the known system of FIG. 5) and may envisage one or more conveyors for conveying products in the aforesaid free condition.

The system described herein is characterized in that provided on the aforesaid conveyors are codes designed to identify a series of distinct mobile areas for reception of the products and in that it comprises one or more devices configured for detecting the codes of the areas of the conveyors as the areas find themselves in a position, along the line, in which the products undergo a given operation, and a control unit configured for processing the aforesaid codes so as to determine one or more data regarding the aforesaid products.

In various preferred embodiments, the system comprises, in particular:
- at least one device configured for detecting the codes of the areas of said conveyors as these areas find themselves in a position where said products are deposited on said areas, and
- at least one device configured for detecting the codes of the areas of said conveyors as these areas find themselves in a position in which said products are released from said conveyors, to another conveyor or to other means;

and said control unit is configured for determining, on the basis of said codes, a datum indicating the position of said products along the conveying line.

In other words, the system described herein uses codes that are carried by the conveyors as reference for knowing the state of the individual products. The codes are detected in the points where the products are subjected to a change of state, which may be represented by transfer of the products to or from the individual conveyor or else by an operation to which the products are subjected. The control unit is configured for keeping track of the changes of state of the products, along the line, on the basis of the codes that are detected during conveying.

Figure 1:
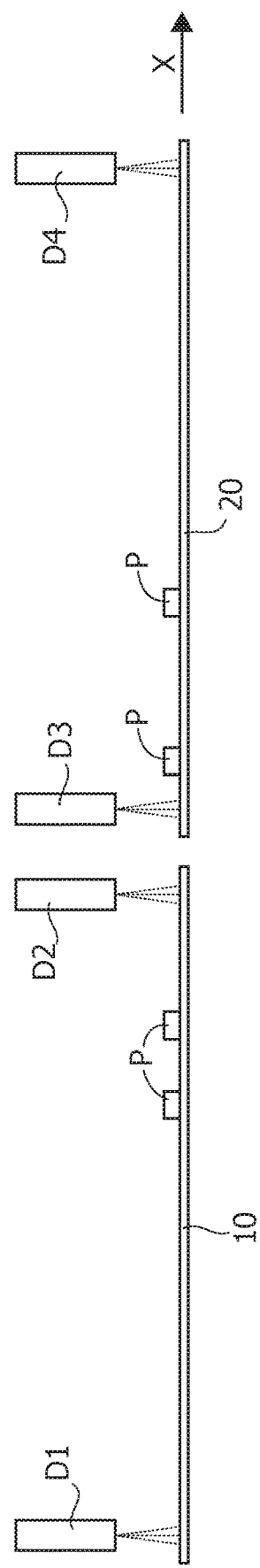
FIG. 1 is a schematic illustration of a lateral view of a portion of a preferred embodiment of the conveying system described herein.
Figure 2:
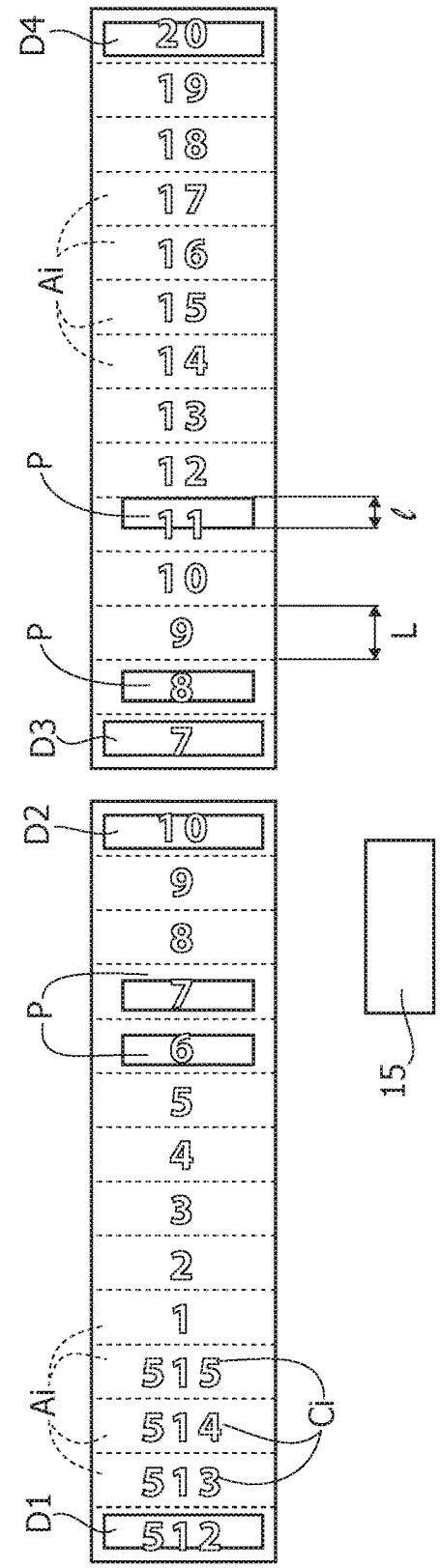
FIG. 2 is a top plan view of the system of FIG. 1.

With reference now to FIGS. 1 and 2, these illustrate an example of embodiment of the conveying system described herein.

The system represented comprises a first conveyor belt 10 and a second conveyor belt 20, set downstream of the first belt 10, which together define one and the same feed direction X.

The two belts face one another in such way that the products that reach the end of the belt 10 are directly transferred onto the belt 20 downstream.

It should now be noted that provided on both of the belts is a series of codes $C_i$ distributed along the length of the belts, in an orderly way, so as to define a succession of distinct areas $A_i$ that constitute predefined areas for reception of the products.

In particular, each area is designed for receiving a set of products, which may be a single product or else a row of products according to the needs of the specific applications.

The width of each area $A_i$—defined in the direction of advance of the belt and identified in the figures by the reference "L"—is clearly a function of the pitch envisaged between one set of products and the next, in such a way that within each individual area it is possible to find a single set of products. Considering the normal applications of conveying systems of the type in question and the pitch between the products envisaged therein, these areas may advantageously have a width slightly less than twice the length of the products (again with reference to the direction of advance of the belt and designated in the figures by the reference "l"). The present applicant has in this connection found that this sizing enables compensation of any possible lack of uniformity in the pitch between the products, or any possible misalignment within the individual rows of products.

Figure 3:
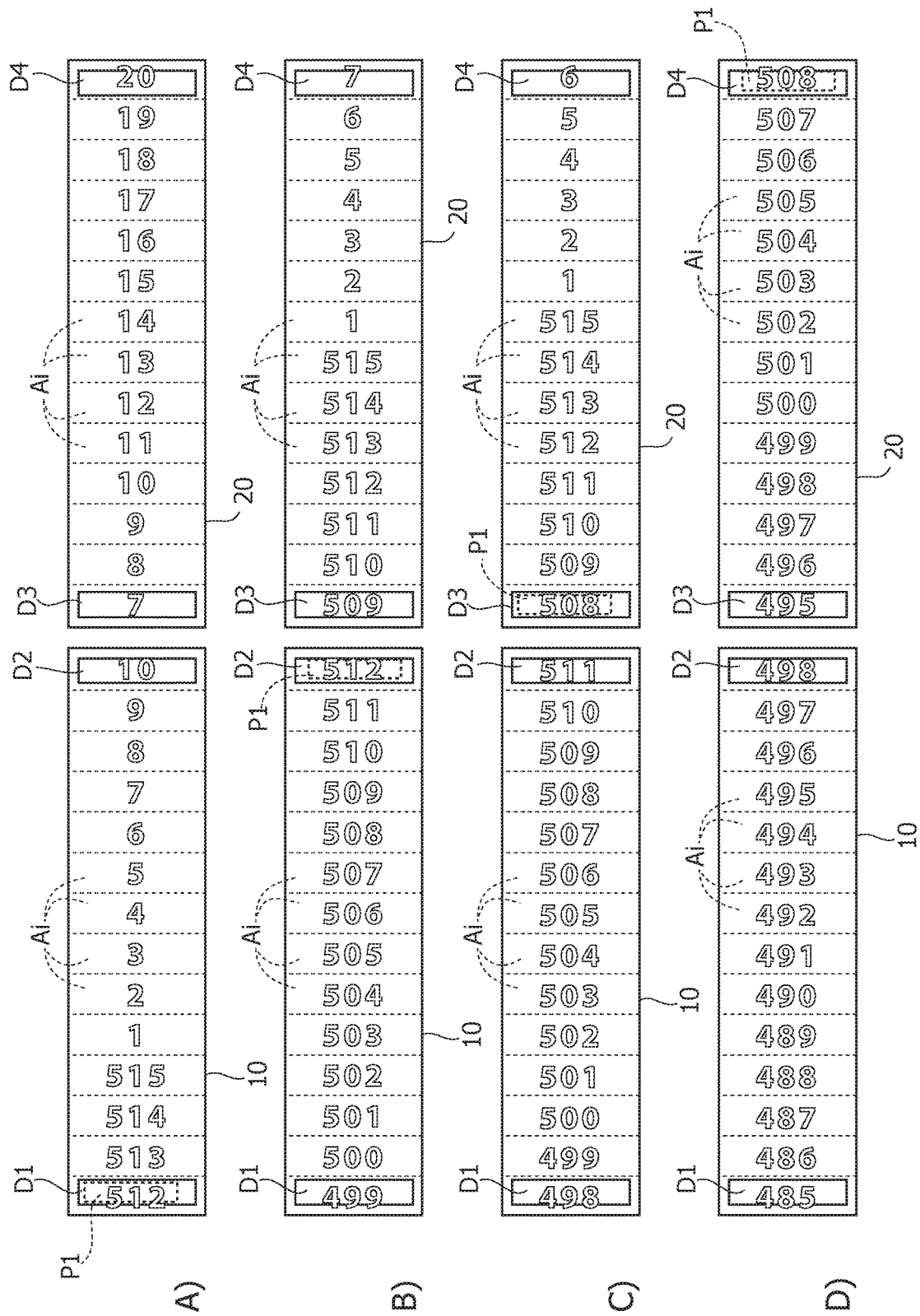
FIG. 3 illustrates successive steps of operation of the conveying system of FIGS. 1 and 2.

The aforesaid codes may be of any type that provides the possibility of automatic reading by a detection device, as will emerge hereinafter. The codes in question may be of an optical type, magnetic type, radiofrequency type, contact type, etc. The representation of the aforesaid codes appearing in FIGS. 2 and 3 is provided purely by way of example. Preferably, the codes are applied in localized points of the belt in order to facilitate reading thereof by the detection devices described in what follows (see in this connection FIG. 6); in this case, the areas $A_i$ are defined by respective portions of the conveyor running from one code $C_i$ to next.

It should again be noted that the areas $A_i$ are defined in themselves by the codes $C_i$ applied on the conveyor belt. It is, however, possible to envisage, in addition to these codes, further marks for demarcating the different areas, for example demarcation lines or else a different colouring for the different areas on the belt.

To return to FIGS. 1 and 2, the system in question moreover comprises a plurality of devices Dy for detection of the aforesaid codes, which are located at the points of the two conveyor belts for input and output of the products. Such devices may be optical devices, devices operating in radiofrequency (RFID devices), magnetic readers, etc., according to the type of the codes provided on the belts.

The location of the aforesaid devices is such that, whenever a new product is loaded onto one of the two belts, the detection device set at the input of the belt detects the code of the reception area on which the product is set and, likewise, when a product reaches the output of the belt, the detection device located in that point detects the code of the reception area from which the product is released. The control unit 15 of the system records these codes and processes them so as to monitor the position of the products and/or one or more process parameters (as described in what follows).

The devices in question may themselves be configured for detecting passage of the product in the aforesaid input and output points of the belt, or else, alternatively, may be associated to a second device having this function.

FIG. 3 exemplifies the control procedure executed by the system.

With reference to step A of the above figure, at the moment when the product P1 is loaded onto the belt 10 in the area of reception identified by the code 512, the device D1 detects the code, and the control unit 15 stores in a memory a correlation between the product P1 and a position "belt 10, area 512" (P1-belt 10-area 512).

When the product P1 reaches the end of the belt 10 (step B), the device D2 again detects the code 512, and the control unit 15 stores for the product P1 the new position "output from belt 10".

The product P1 is immediately transferred onto the belt 20 (step C), where it occupies the area of reception identified by the code 508. The control unit 15 checks that the product with position "output from belt 10" is the product P1, and hence stores the new position "belt 20, area 508" for this product.

Finally, once the product P1 reaches the end of the belt 20 (step D), the device D4 detects again the code 508, and the control unit 15 hence stores the new position "output from belt 20" for the product P1.

As emerges from the foregoing, the system keeps track of the displacements of the individual products and is hence able to know, for each product, at any instant, on which conveyor belt it is located and in which position on that belt.

Moreover, on the basis of these data, the system is able to derive further information on the individual products.

In particular, the system can determine the stay time of the products on the line.

This parameter is very important for industrial lines that handle foodstuff products in so far as it is desirable, and in some cases necessary, for them to be wrapped and/or packaged within a predefined time from when they have been produced, in compliance with the quality standards envisaged.

The system described herein can monitor, for each individual product, the stay time on the line starting from the moment of entry thereon, and, for example, once a pre-set time limit has elapsed, can give priority to that product over other products that are also travelling along the line. As an alternative or in addition, once a maximum time limit has been exceeded, which is a function of the quality standards envisaged, the product can be sent on to be rejected.

In this connection, reference may be made to FIG. 4, which illustrates the same industrial line as that of FIG. 5 but provided with a conveying system of the type described herein. There may, in particular, be noted the detection devices Dy located at the input and output of each conveyor.

Represented in FIG. 4 are two products P1 and P2, which, at the instant represented, are located on the same conveyor, one after the other. However, the path followed up to that point, along the line, by the two products is very different, as represented schematically in the figure via the two traces Z1 and Z2.

As may be seen, even though the product P2 is located upstream of the product P1, it has in fact already traversed the main branch 110 and has been recirculated along the line 120. Instead, the product P1 comes directly from the production line upstream.

The system is able to determine the stay time of the two products on the basis of the respective instants at which the two products have entered the line, more precisely, on the basis of the respective instants at which the two products have been detected and recorded for the first time by the system. In various preferred embodiments, the control unit 15 of the system is configured for identifying the individual products with, or naming them with, the date and/or time at which they are detected for the first time. Consequently, using this datum, which uniquely identifies the individual products, the system is able, at any instant, also to determine their stay time on the line. Calculation of the difference between the instant when the stay time is determined and the time recorded in the identifier (which, as has been said, contains, for example, the date and time) attributed to the individual product is an example of how the stay time can be determined. As shown in the figure, in effect, the stay time of the product P2 on the line is much longer than that of the product P1.

With reference to the situation represented, when the product P1 reaches the detection device D9, the system recognises that the product is the product P1, with a stay time of 40 s, and knows that the product that follows it is the product P2, with a stay time of 540 s.

If precisely at that moment, the packaging machine M3, to which both of the products P1 and P2 could be directed, is immediately available for just one product, the system may decide to allow the product P1 to proceed skipping the machine M3 and, instead, to direct the product P2 to the machine, given its longer stay time.

In this way, the system can prevent the product P2 from remaining on the line longer than a pre-set time. If the pre-set time had, instead, already been exceeded, then the system could direct the product P1 to the machine M3 and send on the product P2 to be rejected.

The system can derive also other information on the individual products.

In this connection, the system can also determine the absolute position of the products along the line, on the basis of the kinematics of the belts (i.e., taking into account parameters such as acceleration, speed, direction of advance, etc.).

The above information may be advantageously used when there is the need to locate a lot of products instantaneously, for example, in the case of a defective lot that is to be removed from the line.

Again, the system may derive information concerning the state of preparation of the products.

For instance, whenever the individual products pass through one of the stations of the line, one or more data regarding the operation carried out in the station are stored.

The system can thus gather information on which are the operations of the process that the products have undergone.

If, for example, one of the machines undergoes a stoppage, the system can immediately identify the products that have passed through the machine while this was inactive, and can hence re-direct them to another machine or else park them in a buffer unit waiting for the machine to start operating again.

If the operations that the products undergo are known, the system can moreover distinguish from one another products of different types that may possibly be produced within one and the same industrial line.

Once again for this purpose, in the case where the line envisages for the different types of product, differentiated paths, the system can instead simply identify the path followed by the individual products, via the codes of the conveyors, and on the basis of the path identified determine the respective types to which to products belong.

Thanks to the capacity for distinguishing one product from another, the system may, for example, direct the products to different packaging stations according to their type.

In view of the foregoing, it emerges clearly that the possibility of monitoring the individual products afforded by the system described enables both greater guarantees on the quality of the products and a more efficient management of the industrial line as a whole.

Finally, it will be evident to the person skilled in the sector that the control unit 15 of the system is provided with software designed to process the various data gathered, for the purposes illustrated above.

In various preferred embodiments, the detection devices Dy referred to are configured for detecting the codes Ci and the products Pi independently. In particular, these devices are configured for detecting the codes Ci whenever one of these passes in front of the device, and likewise for detecting the products Pi. As already mentioned previously, the two functions may, alternatively, be carried out by two different detection devices or units.

The control unit is configured for associating a given product to a given area at the moment when the first unit of the device detects the code of that area and the second unit detects that the product is located in that area.

As will be illustrated hereinafter, the above configuration renders the system capable of operating properly even when the products are arranged on the belt in a non-uniform way with respect to the distribution of the codes Ci on the belt itself, for example straddling two areas Ai defined by two different codes Ci.

Figure 6:
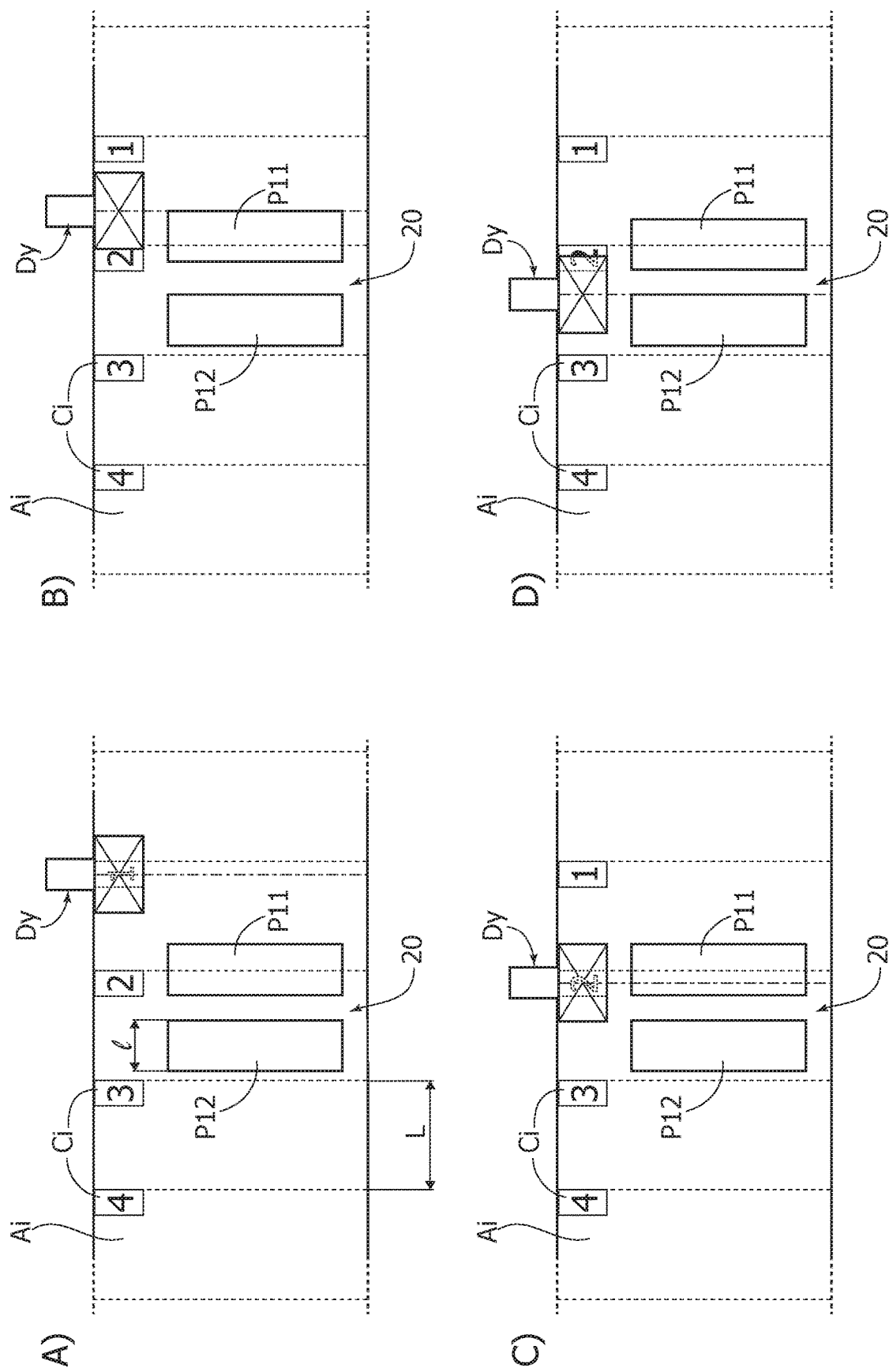
FIG. 6 illustrates successive steps of operation of a preferred embodiment of the conveying system described herein.

In this regard, FIG. 6 represents a condition in which a product P11 is set straddling the two areas 1 and 2 of the belt 20 and is followed by a product P12 that is, instead, completely contained within the area 2.

According to the configuration indicated above, at the instant when the area 1 comes to correspond to the detection device Dy, this initially detects just the code 1, which is stored in the control unit (step A).

Next, following upon the further advance of the belt 20, the device Dy also detects the product P11, and the control unit hence stores a correlation between the product P11 and the position "belt 20, area 1", as already described previously (step B).

A few instants later, while the product P11 is still passing in front of the device Dy, also the code 2 comes to correspond to the device Dy and is hence detected thereby and stored in the control unit (step C).

The device continues at the same time to detect the product P11, but, since this is the same product already identified, it remains assigned to the area 1.

Instead, when the next product P12, entirely contained in the area 2, comes to correspond to the device Dy, this detects passage of the new product, and the control unit stores a correlation between the new product P12 and the position "belt 20, area 2" (step D).

In the light of the foregoing, it is now evident that, even if a product comes to occupy two distinct areas, as in the case of the product P11, the system keeps as reference position only the area that is occupied by the "front" of the product so that the system is in any case able to keep track of the product without committing any errors.

In this context, it may on the other hand be understood that the maximum width (L), indicated previously, of the individual areas Ai, which is just slightly less than twice the length "l" of the individual product or of the individual row of products, makes it possible to have a single product front for each area Ai, consequently enabling association of just one product to each area, even when the products are positioned on the belt in an other than perfectly orderly way within the individual areas.

Of course, without prejudice to the principle of the invention, the details of construction and the embodiments may vary even significantly with respect to what has been illustrated herein purely by way of non-limiting example, without thereby departing from the scope of the invention, as this is defined by the annexed claims.

The invention claimed is:

1. A system for conveying products in succession along an industrial line, said system comprising at least one mobile conveyor (10, 20) configured for conveying the products along at least one stretch of said line;
   wherein provided on said conveyor are codes (Ci) designed to identify a series of distinct mobile areas (Ai) for reception of the products;
   said system comprising:
      one or more devices (Dy) configured for detecting the codes (Ci) of the areas of said conveyor in one or more positions, along said line, where, or in the proximity of which, said products undergo an operation; and
      a control unit (15) configured for determining one or more data regarding the state of said products on the basis of said codes (Ci),
      wherein at least one device (Dy) is configured for detecting the codes (Ci) of the areas of said conveyor in a position, along said line, where said products are deposited on said areas of said conveyor;
      wherein at least one device (Dy) is configured for detecting the codes (Ci) of the areas of said conveyor in a position, along said line, where said products are released from said conveyor to another conveyor or to other means; and
      wherein said control unit (15) is configured for determining, on the basis of said codes (Ci), a datum indicating the position of said products.

2. The system according to claim 1, wherein said control unit (15) is configured for determining a parameter indicating the stay time of each product in said industrial line, as a function of a signal indicating the instant when the code of the area of a first conveyor on which the product has been deposited has been detected.

3. The system according to claim 1, wherein said codes (Ci) are of at least one of the following types: optical type, magnetic type, radiofrequency type, or contact type.

4. The system according to claim 1, wherein said conveyor is constituted by a conveyor belt.

5. The system according to claim 1, comprising a plurality of conveyors, and including for each conveyor:
   at least one device (Dy) configured for detecting the codes (Ci) of the areas of said conveyor in a position, along said line, where said products are deposited on said areas of said conveyor; and
   at least one device (Dy) configured for detecting the codes (Ci) of the areas of said conveyor in a position, along said line, where said products are released from said conveyor to another conveyor, or to other means.

6. The system according to claim 1,
   wherein said conveyor passes through a station for processing said products,
   said system comprising at least one device (Dy) configured for detecting the codes (Ci) of the areas of said conveyor that access said station,
   and wherein said control unit (15) is configured for determining, on the basis of said codes (Ci), a datum indicating the state of processing of said products.

7. The system according to claim 6, comprising a plurality of conveyors that pass through different processing stations designed for the production of different types of products, and wherein said system comprises, for each conveyor, at least one device (Dy) configured for detecting the codes (Ci) of the areas of said conveyor that access the station through which said conveyor passes,
and wherein said control unit (15) is configured for determining, on the basis of said codes (Ci), a datum indicating the type of the individual products.

8. The system according to claim 5, comprising one or more recirculation conveyors configured for receiving the products in a final stretch of said line and bringing them back again into an initial stretch of said line.

9. The system according to claim 1, wherein said devices, or further detection devices of said system, are configured for identifying passage of said products in said positions along said line, where said products undergo an operation, or in the proximity of said positions.

10. The system according to claim 9, wherein said devices are configured for identifying said codes (Ci) and said products independently, and wherein said control unit is configured for storing a relation between a given product and a given code following upon combined detection of said given code and of said given product within the area of reception (Ai) determined by said code (Ci).

11. The system according to claim 1, wherein said codes (Ci) are applied on said conveyor at a distance from one another that is such as to define areas of reception (Ai) of dimensions smaller than twice the dimension of said products in the direction of advance of said conveyor.

12. A method for conveying products in succession, along an industrial line, via a conveying system comprising at least one mobile conveyor (10, 20), there being provided on said conveyor codes (Ci) designed to identify a series of distinct mobile areas (Ai) for reception of the products;
said method comprising the steps of:
    subjecting said products to an operation in respective areas of said conveyor;
    detecting, via a detection device (Dy), the codes of the areas of said conveyor in which said products undergo said operation; and
    determining one or more data regarding the state of said products on the basis of said codes (Ci),
    depositing in succession products on respective areas (Ai) of said conveyor;
    detecting, via a detection device (Dy), the codes (Ci) of said areas on which said products have been or are being deposited;
    storing in a memory a correlation between said products and said codes of said conveyor;
    releasing in succession said products from said areas (Ai) of said conveyor; and
    detecting, via a detection device (Dy), the codes (Ci) of said areas (Ai), and storing in said memory a correlation between said products and data indicating their position of output from said conveyor.

13. The method according to claim 12, comprising the steps of:
    feeding said products arranged on respective areas (Ai) of said conveyor to a processing station;
    detecting the codes (Ci) of said areas (Ai); and
    storing in a memory a correlation between said products and one or more data indicating the processing operation carried out in said station.

14. The method according to claim 12, comprising the step of determining, for each product, a parameter indicating the stay time of the product on the line, on the basis of the instant when the code (Ci) of the area (Ai) of a first conveyor on which said product has been deposited has been detected.

15. The method according to claim 12, wherein said conveying system comprises a plurality of conveyors arranged in succession, said method envisaging execution of said steps for each conveyor.

16. The method according to claim 15, wherein said conveying system comprises one or more recirculation conveyors configured for receiving the products in a final stretch of said line and bringing them back again to an initial stretch of said line.

17. The method according to claim 12, which envisages providing in a control unit of the system data-processing programs designed to determine a state of said products on the basis of said codes and/or of said correlation between said products and said codes of said conveyor and said correlation between said products and data indicating their position of output from said conveyor.

18. The method according to claim 17, wherein said state of said products regards at least one of the following: the position, the state of preparation, the type, and the stay time on the line.

\* \* \* \* \*